United States Patent [19]
Walker

[11] 4,067,928
[45] * Jan. 10, 1978

[54] METHOD OF PREPARING VINYL HALIDE POLYMERS AND COPOLYMERS WITH POLYOLEFINS

[75] Inventor: Leigh E. Walker, Lewiston, N.Y.

[73] Assignee: Hooker Chemicals & Plastics Corporation, Niagara Falls, N.Y.

[ * ] Notice: The portion of the term of this patent subsequent to Feb. 8, 1994, has been disclaimed.

[21] Appl. No.: 746,048

[22] Filed: Nov. 30, 1976

Related U.S. Application Data

[63] Continuation-in-part of Ser. No. 541,163, Jan. 15, 1975, Pat. No. 4,007,235.

[51] Int. Cl.² .................. C08F 255/02; C08F 255/04; C08F 255/06; C08F 255/08
[52] U.S. Cl. ................................................. 260/878 R
[58] Field of Search .................................. 260/878 R

[56] References Cited

U.S. PATENT DOCUMENTS 4,007,235  2/1977  Walker .............................. 260/878 R Primary Examiner—Alan Holler
Attorney, Agent, or Firm—Peter F. Casella; James F. Mudd; David A. Stein

[57] ABSTRACT

Polymers of excellent impact strength, reduced particle size, and enhanced proportions of fines are obtained in the bulk polymerization of a vinyl halide or mixture thereof with comonomer(s) in the presence of a high molecular weight polyolefin added to the polymerization mass upon conversion of 0 to about 20% by weight of monomer(s) to polymer, by removing from the polymerization mass during the thick paste state thereof sufficient vinyl halide to adjust the effective concentration of polyolefin to above about 3.5% based on vinyl halide. The resultant product which contains an enhanced proportion of fines and is devoid of massive agglomerates, requires less mechanical work in comminution or shorter heating in melting in subsequent conventional processing steps.

58 Claims, No Drawings

METHOD OF PREPARING VINYL HALIDE POLYMERS AND COPOLYMERS WITH POLYOLEFINS

CROSS REFERENCE TO RELATED APPLICATIONS

This is a continuation-in-part of copending application Ser. No. 541,163 filed Jan. 15, 1975 now U.S. Pat. No. 4,007,235.

BACKGROUND OF THE INVENTION

1. FIELD OF THE INVENTION

This invention relates to an improvement in the preparation of polymers of high impact strength and enhanced processability. More particularly the invention relates to an improvement in the bulk polymerization of vinyl halide or vinyl halide-comonomer mixtures in the presence of high concentrations of high molecular weight polyolefins. It is especially concerned with a novel improvement in said polymerization which diminishes formation of product agglomerates and provides a more finely divided, more homogeneous, and more easily processed particulate polymer.

2. DESCRIPTION OF THE PRIOR ART

It is known to polymerize a vinyl halide, e.g. vinyl chloride, or up to about 50 weight percent of mixture thereof with a compatible comonomer in bulk in the presence of a polyolefin to obtain a vinyl halide polymer of improved impact strength an processability. Thus, according to U.S. application Ser. No. 674,202, filed Apr. 5, 1976 of A. Takahashi which is a continuation-in-part of U.S. application Ser. No. 427,895, now abandoned, filed Dec. 26, 1973, as a continuation-in-part of Ser. No. 251,099 filed May 8, 1972, now abandoned, vinyl halide or a vinyl halide-comonomer mixture can be polymerized in a single or two stage bulk reaction in the presence of about 0.05 to about 20% of a polyolefin rubber of weight molecular weight ranging from about 50,000 to 1,000,000 or higher to produce a polyvinyl halide product containing both free, i.e. dispersed, and grafted polyolefin of excellent impact strength, and other desirable properties such as reduced melt viscosity. It is now found, however, that polymers of especially excellent high impact strengths. of the order of about 10 to 20 foot-pounds per inch or greater, are obtained as a general result in the reference process when the amount of polyolefin charged is above about 3.5 weight percent, preferably above about 5.3 weight percent based on the vinyl halide concentration, However, it is also found that use of such high concentrations of polyolefin, especially of polyolefins of molecular weight above 150,000 incurs difficulties in mixing the reaction mass, and results in a product having a relatively low proportion of finely divided particles and a substantial number of relatively massive lumps or agglomerates. In the reference polymerization, as soon as the agitated reaction mixture is warmed up to initiate polymerization, the polymerization mass proceeds from a substantially clear solution or dispersion of polyolefin in vinyl halide or vinyl halide-comonomer mixture to a milky, opaque emulsion. After about one hour, the reaction becomes a paste, and after about 1.5 hours of reaction, corresponding to about 25 to 30% conversion of vinyl halide to polymer, the reaction isotherm shows a rapid increase, with concurrent thickening of the paste, i.e. development of a "thick paste state" in the reaction mass. After about 40 and 45% conversion of the vinyl halide monomer to polymer, the thick paste becomes, in the main, a fine non-viscous powder. When high concentrations of polyolefin are charged to the reaction in order to obtain the aforementioned polymer of exceptionally good impact strength, the thick paste state of the reaction mixture is so viscous, i.e. of consistency substantially similar to unbaked dough, that the agitation of the mixture provides little mixing effect in the polymerization mass. In other words the reaction mixture consists of several large dough-like agglomerates, or in extreme cases, a single dough-like lump, adhering to, and revolving or rotating upon the agitator or stirrer. When the reaction is carried to completion from the aforementioned thick paste state, the product contains a relatively small proportion of evenly shaped finely divided particles compared to the proportion of such fines obtained when the polyolefin is charged at low concentrations, i.e. at 5.3% by weight or less or especially at 3.5% by weight or less based on the vinyl halide employed. The product also contains, one or several massive irregularly shaped agglomerates which agglomerate or agglomerates can in extreme cases comprise a major or a predominant part of the polymer product. The particulate product of the reference process normally has hard fused surfaces and generally large particles threin must be comminuted, e.g. by grinding or equivalent pulverization process, to make them suitable for conventional polymer processing steps. The latter operations generally entail handling the polymer in a fluid melted state. Accordingly polymer processing of the aforementioned large particles or massive agglomerates entails undesirable, costly expenditure of mechanical energy in pulverization of the particles. Alternative direct melting or fusion of the products containing the massive agglomerates and a large proportion of relatively large particles also generally requires prolonged heating of the product which can affect deleteriously the polymer color and/or degrade the polymer. The large product particles and agglomerates obtained by employing the aforementioned relatively high amounts of polyolefin in the reference process are generally less homogeneous than small product particles since high local concentrations of monomer, polyolefin and reaction initiator build up within the large particles and especially within the massive agglomerates absent effective mixing within these large particles during their formation in the thick paste state. Additionally, poor heat transfer from within the relative massive body of these particles deleteriously affects the homogeneity of the polymer within the particle.

The reference process generally prescribes agitation of the polymerization mass, but as pointed out above and as illustrated in Example 2 below such agitation does not prevent formation of product agglomerates and undesirably large proportions of large particles in the product when the aforementioned large concentrations of polyolefin are employed in the polymerization. Moreover increasing the speed of the agitation in the reaction would not be a feasible method of overcoming the aforementioned disadvantages of the reference process, since in the thick paste state of the polymerization wherein the undesirable agglomerates and large particles arise, the dough-like reaction mass collects upon, and revolves with, therotating or revolving agitator or stirrer. Accordingly, increasing the speed of the agitation would not increase the internal mixing in the agglomerated reaction mass and might, especially at extremely high agitation speeds, damage the agitator or the agitator motor.

SUMMARY OF THE INVENTION

According to the invention the disadvantages associated with the prior art process are overcome by an improvement in the process for preparation of a vinyl halide polymer which comprises polymerizing in bulk a vinyl halide monomer, in liquid phase, either alone or in combination with up to about 50% by weight of another ethylenically unsaturated monomer copolymerizable therewith in the initial presence of more than about 1.8% by weight based on said vinyl halide monomer of a polyolefin or mixture of polyolefins having a weight average molecular weight of at least about 50,000 This improvement comprises removing from the polymerization mass during the thick paste state thereof a sufficient amount of the vinyl halide in the polymerization mass to raise the effective concentration of said polyolefin to above about 3.5 weight percent based on vinyl halide remaining in said mass afer said removal of vinyl halide, whereby polymerization mass agglomerates are broken up and a more finely divided particulate product of high impact strength is obtained.

In general the present process permits relatively high effective concentrations of the polyolefin to be employed in the prior art vinyl halide polymerization process of aforementioned U.S. Ser. No. 674,202 to obtain finely divided polymer products of a relatively great concentration of grafted polyolefin, e.g. above about 6.0%, usually above about 8%, based on the weight of the product, and hence an improved impact strength, e.g. about 10 to 20 foot-pounds per inch as measured by the Notched Izod Impact Test. (ASTM D-256). The removal of vinyl halide monomer in accord with the invention provides a substantially more finely divided product than when such removal is omitted, i.e., the proportion of smaller size particles e.g. particles of cross sectional width less than about 1.2 mm, in the product is substantially increased, typically by about 200% or more, and the maximum product particle size is greatly diminished, typically twenty-fold or more, as illustrated by a comparison of the results of Examples 1 and 2 below. Accordingly, to obtain homogeneously pulverized polymer suitable for conventional polymer processing, substantially less mechanical work is required for comminution of the present polymer products than is required for comparable agglomerated polymers obtained by the prior art process. Alternatively, if it is desired to process the present polymers without a preceding comminution step, the present finely divided polymers are found to require, in general, shorter heating for melting than is the case with the comparable reference process products containing massive agglomerates and substantially greater proportions of larger particles. Thus on melting, the present polymer products are exposed to extreme temperatures for shorter periods thereby diminishing the deleterious effect that such temperatures may have upon polymer stability and color. Since the present product contains a substantially greater proportion of smaller size particles and is devoid of the massive product agglomerates obtained in the prior art process when effective polyolefin concentrations above about 3.5% or especially above about 5.3% are employed, the particulate product of the invention is also of a more homogeneous constitution than the reference product.

It was highly surprising to discover that vinyl halide monomer removal in accordance with the invention was effective in breaking up reaction mixture agglomerates since, in general, the prior art associated with vinyl halide bulk polymerization has taught such removal to be undesirable or has prescribed addition of vinyl halide to the polymerization mass to break up agglomerates. Thus U.S. Pat. No. 2,230,240 to H. L. Gerhart which is directed to bulk polymerization of a vinyl compound, e.g. vinyl halide, and a maleic anhydride comonomer requires the reaction to be carried out under a sufficient reaction process to prevent escape of the vinyl monomer since such removal by venting causes ebullition of the polymerization mass which impairs the homogeniety of the product. Moreover, U.S. Pat. No. 2,961,432 to H. Fikenscher et al. which contemplates bulk polymerization of a vinyl compound, e.g. vinyl halide, in the presence of a polymer thereof teaches (see col. 3, lines 15-21) that is especially desirable to add vinyl monomer in vapor from the agitated polymerization mass to avoid agglomeration in the reaction mixture, which teaching contradicts the improvement step of the present invention.

DETAILED DESCRIPTION OF THE INVENTION AND PREFERRED EMBODIMENTS THEREOF

Except for the above-defined improvements of the invention, the reactants of reaction conditions, e.g. reaction temperature and pressure, are substantially the same as those of the polymerization disclosed in the aforementioned U.S. application, Ser. No. 674,202, the pertinent subject matter whereof is incorporated here by reference.

The vinyl halide utilized in the present process is preferably vinyl chloride, although other vinyl halides such as vinyl fluoride and vinyl bromide can be employed also.

In carrying out the present improved process the vinyl halide monomer can be removed from the thick paste state of the agitated polymerization reaction mass in any suitable way. For example the liquid monomer may be filtered from the bulk reaction mass e.g. by passage through a pressure filter. The filtrate is then distilled outside the reaction vessel with the distillation residue containing initiator and unreacted polyolefin being returned to the reaction vessel. However, since the polymerization is generally carried out under at least autogeneous superatmospheric pressure, especially when vinyl chloride is employed as the vinyl halide reactant, removal of the vinyl halide is preferably achieved by venting the reaction mixture to a pressure zone e.g. the atmosphere, wherein the pressure is substantially below the reaction pressure. Removal by venting is especially desirable since it promotes rapid removal of heat from the reaction mass. Vinyl halide monomer removal is commenced during the above-described thick paste state of the reaction the duration of which corresponds to conversion of polymer of about 25% to about 45%, more typically about 30% to about 40% by weight of vinyl halide, based on vinyl halide charged. The onset of the thick paste state is generally accompanied by a rapid increase in the heat evolved from the reaction, i.e. by a rapid increase in the reaction isotherm as evidenced by a sharp increase in reaction pressure. Preferably vinyl halide removal in accordance with the invention is commenced about 5 minutes to about 15 minutes after beginning of the thick paste state of the polymerization. The venting of vinyl halide from the reaction mass according to the preferred mode of removal of vinyl halide may be carried out in continuous fashion, or alternatively and desirably, in intermittent but regular fashion with the reaction mass being restored, after each release of vinyl halide, substantially to the temperature and pressure prevailing in the reaction mass prior to each release of the monomer. The polymerization vessel is desirably equipped with a conventional adjustable valve to facilitate venting.

The amount of vinyl halide monomer which is removed during the thick paste state of the polymerization reaction in order to avoid product agglomerates according to the invention is generally a minor proportion of the vinyl halide employed in the polymerization, i.e. less than about 50 weight percent of the vinyl halide charged. Preferably, however, to retain substantially all of the benefits and advantages of the prior art polymerization process of aforementioned U.S. Ser. No. 674,202, no more than about 40 weight percent, typically no more than about 30 weight percent, of the vinyl halide charged to the polymerization is removed in the present process. While some improvement in obtaining finely divided polymer product of small maximum particle size can be achieved by removing only small small amounts, say 2 to 3% by weight, of vinyl haide during the thick paste state of the polymerization, it is preferred to remove at least about 5 weight percent of the vinyl halide charged in the practice of the invention. Preferably the percentage of vinyl halide removed can vary from about 8 to 15% up to about 25 to 35%, and is more preferably about 15 to 35% based on the vinyl halide charged.

The rate of removal of vinyl halide by venting or other removal technique can be varied over a wide range but usually about 0.1% to about 1.5% preferably about 0.15% to about 1.2% per minute based on the weight of vinyl halide charged. An especially good result is generally obtained when the vinyl halide is removed from the polymerization mass at a rate which can range from about 0.3% to about 0.8% up to about 1.0% or even up to about 1.2% by weight per minute.

The proportion of vinyl halide and polyolefin charged initially to the polymerization may vary over a wide range but should be sufficient to provide, after vinyl halide removal in the thick past state, an effective polyolefin concentration of from above about 3.5% to about 20% by weight, preferably at least above about 5.3% and especially is about 5.5% to about 10% by weight computed on the amount of vinyl halide remaining after removal of vinyl halide according to the invention i.e. on the amount of vinyl halide charged minus the amount of vinyl halide removed in the thick paste state of the polymerization. An especially good result is generally obtained when the initial charge of polyolefin and vinyl halide and the amount of vinyl halide removed in the thick paste state of the reaction are sufficient to provide an effective polyolefin concentration of about 6 to about 8% or even up to about 9% by weight. Usually the initial concentration of polyolefin and vinyl halide in the polymerization are such as to provide a reaction mixture containing before venting or other removal of the vinyl halide, above about 1.8% and desirably at least about 3%, typically about 3.5% or greater of polyolefin based on the weight of vinyl halide charged.

While the exact chemical nature of the polymer formed by the process of the present invention is not known, it is believed that a graft copolymer is formed in which the vinyl halide polymer forms upon the polyolefin polymer. To obtain a maximum reduction in melt viscosity which is a standard measure of processability, the polymer used as the trunk polymer is graft polymerization should be incompatible with the vinyl halide polymer formed. During the processing of a polymer of a vinyl halide such as in molding, the physical properties of the polymer change during the processing as the result of the polymer being held at high temperatures for long periods of combination with the internal heat built up as a result of shear forces produced by the processing machinery. Thus, the physical properties of a graft polymer having a trunk polymer which is compatible with the vinyl halide polymer can change during processing as the result of solubilization of the trunk polymer into the polyvinyl halide. In such a case, the impact strength would decrease during the processing. Therefore, the compositions of the present invention are directed to graft copolymers having a polyolefin backbone polymer which is incompatible with the vinyl halide polymer formed thereon. With such an incompatible polymer backbone, the physical properties of the graft copolymer do not change during processing, since the incompatibility prevents the solubilization of the trunk polymer in the polyvinyl halide. The melt viscosity is reduced by the choice of a graft copolymer and is not affected by the usual subsequent processing conditions.

The melt viscosity of the graft copolymer formed also depends upon the molecular weight of the trunk polymer, as well as the vinyl halide polymer formed thereon. A maximum reduction of melt viscosity can be expected from the graft copolymer where the trunk polymer is chosen so as to have low molecular weight, e.g. a weight average molecular weight of 50,000 to 150,000 and the vinyl halide monomer is polymerized so as to have a reasonably low molecular weight also, such low molecular weight olefin polymers being preferred for especially easy processing in the molten state. Preferably to produce polymer products of excellent impact strength, i.e. of high graft polyolefin content or high grafting efficiency, the weight average molecular weight of the polyolefin may range from about 150,000 to about 1,000,000 or higher and is especially about 150,000 to about 400,000.

While vinyl chloride is the preferred vinyl halide reactant of the invention, other suitable vinyl halide monomers useful in the invention are the alpha-halosubstituted ethylenically unsaturated compounds which like vinyl chloride are capable of entering into an addition polymerization reaction, for example, vinyl fluoride, vinyl bromide, vinyl iodide, vinylidene fluoride, vinylidene chloride, vinylidene bromide, vinylidene iodide and the like. The polymers of the present invention can be formed of the same or different alpha-halosubstituted ethylenically unsaturated materials and, thus, the invention includes homopolymers, copolymers, terpolymers, and interpolymers formed by addition polymerization. Illustrative of these copolymers is a copolymer of vinyl chloride and vinylidene chloride.

While it is preferred that the monomer composition be comprised totally of vinyl halide monomer, e.g. vinyl chloride alone, the present invention is also intended to include copolymers formed by the free-radical addition polymerization of a monomer compostion containing a predominant amount, e.g., at least 50 percent of vinyl halide and a minor amount, e.g., less than 50 percent by weight of another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer. Suitable ethylenically unsaturated compounds which can be used to form copolymers, terpolymers, tetrapolymers, interpolymers and the like, are illustrated by the following monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyether and teritary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alphabromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate and ethyl alpha-chloroacrylate, methyl alpha-chloroacrylate and ethyl alpha-chloroacrylate, methyl alpha-bromoacrylate, ethyl alpha-bromoacrylate, methyl alphafluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and alkyl alphacyanoacrylates, e.g., methyl alpha-cyanoacrylate and ethyl alphacyanoacrylate; maleates, e.g., monomethyl maleate, monoethyl maleate, dimethyl maleate, diethyl maleate; and fumarates e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl proply ether, vinyl n-butyl ether, vinyl isobutyl ether, vinyl 2-ethylexyl ether, vinyl 2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like, and vinyl sulfides, e.g., vinyl beta-chloroethyl sulfide, vinyl beta-ethoxyethyl sulfide and the like can also be included. Diolefinically unsaturated hydrocarbons containing two olefinic groups in conjugated relation and the halogen derivates thereof, e.g., butadiene-1,3; 2-methyl-butadiene-1,3; 2,3-dimethylbutadiene-1,3; 2-methyl-butadiene-1,3; 2,3-dimethyl-butadiene-1,3; 2-chloro-butadiene-1,3; 2,3-dichlorobutadiene-1,3; and 2-bromo-butadiene-1,3 and the like can also be used.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

The free radical bulk polymerization of the monomer composition is conducted in the presence of an olefin homopolymer, copolymer, terpolymer, or tetrapolymer and halogenated derivates thereof. The olefin polymers can also contain a diene as a monomer unit.

Suitable monomers are propene, butene-1, isobutene, pentene, hexene, heptene, octene, 2-methylpropene-1, 3-methylbutene-1, 4-methylpentene-1, 4-methylhexene-1, 5-methylhexene-1.

Suitable comonomers are those utilized to prepare homopolymers as listed above such as propene or butene-1 with ethene or isobutylene with isoprene, ethene with vinylacetate, ethene with ethyl acrylate, and the like. Suitable termonomers are those utilized to prepare homopolymers and copolymers as disclosed above such as propene, ethene and the like containing up to 15 percent preferably up to about 6 percent by weight of a diene such as dicyclopentadiene, butadiene, cyclooctadiene and other non-conjugated dienes with linear or cyclic chains.

The polyolefins used are characterized by being soluble, partially soluble or dispersible at normal room temperature and pressure in vinyl chloride monomer and if a homopolymer having monomeric units with 2 to 8 carbon atoms; if copolymers, having monomeric units with 2 to 8 carbon atoms; and if a halogenated polymer, having monomeric units with 2 to 8 carbon atoms. Suitable halogenated polyolefins are the chlorinated, brominated, or fluorinated polyolefins. The weight average molecular weight of the olefin polymers, copolymers, terpolymers, and tetrapolymers can vary from about 50,000 to about 1,000,000 and higher as described above.

The free radical bulk polymerization can take place in accordance with the process of the invention at temperatures between about 25° and about 90°, preferably about 40° to about 80°, and especially about 50° to about 75°, centigrade. The polymerization reaction is conducted in the presence of a small initiating amount of a free radical initiator for the reaction. Useful free-radical initiators are organic or inorganic peroxides, persulfates, oxonides, hydroperoxides, peracids and percarbonates, diazonium salts, diazotates, peroxysulfonates, trialkyl borane-oxygen systems, amine oxides, and azo compounds such as 2,2'-azo-bis-isobutyronitrile and 2,2'-azo-bis-2, 4-dimethyl valeronitrile. Preferably an azo compound or an organic peroxy compound, especially an organic peroxide, is used as the initiator. The initiator is used in a concentration ranging from about 0.01 to about 1.0% and preferably about 0.05 to about 0.5% based on the total weight of all monomers in the reaction mixture. Organic initiators which have particularly good solubility in the bulk polymerization mass as disclosed aforementioned U.S. application Ser. No. 674,202, and hence, are especially useful in the practice of the invention include the following representative examples: lauroyl peroxide, benzoyl peroxide, diacetyl peroxide, azobisisobutyronitrile, diisopropyl peroxydicarbonate, azo-bis-isobutyramidine hydrochloride, t-butyl peroxypivalate, 2,4-dichlorobenzoyl peroxide, and 2,2'-azo-bis-(2,4-dimethyl valeronitrile). These and other suitable initiators are more particularly described by J. Brandrup and E. H. Immergut, Editors "Polymer Handbook", Interscience Publishers, 1966, Chapter II entitled "Decomposition of Organic Free Radical Initiators", the pertinent disclosure whereof is incorporated herein by reference. Advantageously, the initiator which is used is chosen from a group of initiators known in the prior art as the "hot catalysts" or those which have a high degree of free-radical initiating activity. Initators with a lower degree of activity are less desirable in that they require longer polymerization times. Also, long polymerization times may cause preliminary product degradation evidenced by color problems, e.g., pinking.

The present process is preferably carried out in a single stage bulk operation but, if convenient or desired the reaction can be effected in a two stage reaction configuration in which high speed, high shear agitation is used during a first stage, and low speed, low shear agitation is used in a second stage. Two stage bulk polymerizaion processes for vinyl halide and vinyl halide-comonomer mixtures which are useful in the practice of the invention are described in aforementioned U.S. application Ser. No. 674,202, as well as British Pat. No. 1,047,489 and U.S. Pat. No. 3,522,227, to Thomas the pertinent disclosure of which patents is incorporated herein by reference.

In the following abbreviated description of a typical two stage reaction configuration for carrying out the present process, for the sake of simplicity, the initial stage of the polymerization or copolymerization will be referred to as first stage reaction and the vessel in which this initial stage of polymerization is carried out will be referred to as "Prepolymerizer". The final or complementary stage of the polymerizaion will be called simply second stage reaction and the vessel in which it is carried out the "Polymerizer".

In the first stage reactor, the means chosen to agitate the monomer or monomers is of a type capable of providing high shear agitation and is commonly referred to as a "radial turbine type" agitator. At the start of the first stage reaction, the Prepolymerizer is charged with a monomer composition to which an initiator has been added. Any polymerization generally used in bulk polymerization methods, that is, those hereinabove described, can be used to an extent which is usual for bulk polymerization processes. After addition of the vinyl chloride monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of at least about 0.1, and preferably, about 0.5 to about 2 meters per second is used in the second stage reactor. These figures should not be regarded as limiting values. As soon as a conversion of at least about 3 to about 20 percent of the monomer composition has been obtained in the first stage reactor, the contents of the vessel are transferred to a second stage polymerizer vessel equipped to provide slow speed, low shear agitation so as to insure proper temperature control of the reaction medium. Preferably the conversion in the first stage reactor is about 3 to about 15 percent and is especially about 7 to about 15 percent. The reaction temperature in both first and second stage reactors generally ranges between about 25° centigrade to about 90° centigrade, preferably about 40° to about 80° centigrade. The reaction pressure in the first stage reactor is also at least an autogeneous superatmospheric pressure generally in the range between about 80 to about 210 pounds per square inch, and preferably between about 90 to about 190 pounds per square inch.

Since the minimum conversion (e.g. about 25–30%) of vinyl halide corresponding to onset of the thick paste state of the polymerization invariably occurs in the second reaction stage of the above described two stage reaction configuration, vinyl halide monomer is always removed from the second stage of the two stage reaction process in accordance with invention. However, as will be evident to those skilled in the art, the conditions of temperature pressure and agitation of the second stage are substantially similar to, and hence, typify those used when carrying out the present improved polymerization in a single reaction stage.

The improved polymerization product of the invention is recovered from the polymerization reaction vessel in conventional fashion, e.g., by expelling unreacted monomers by venting. The present finely divided products are easily ground or otherwise comminuted to a homogeneous powder for admixture with conventional inert additives such as fillers, dyes, and pigments. In addition, the polymerization products can be admixed with plasticizers, lubricants, thermostabilizers and ultraviolet and light stabilizers as desired. If desired the present product can be directly melted for combination with the aforementioned additives and subsequent molten processing, such as molding and extrusion. The melting or fusion of the present polymers which contain predominantly, finely divided particles, occurs so rapidly as to avoid any serious decomposition or color-degradation caused by exposure to elevated temperature during the melting or fusion operation.

The exact mechanism by which the present process effectively breaks up reaction mixture agglomerates is not understood completely, but while the invention is not bound to any theory it is surmised that removal of vinyl halide in accord with the invention increases the ratio of solid phase, i.e. polymer, to liquid phase, i.e. vinyl halide monomer containing dissolved or dispersed polyolefin, in the reaction mass and hence rapidly advances the reaction mass out of the thick paste state into the fluid powder state described hereinabove.

In order to further illustrate the invention but without being limited thereto, the following examples are given. In this specification and claims, unless otherwise indicated, parts, percentages and proportions are by weight and temperatures are in degrees centigrade.

EXAMPLE 1

A two liter cylindrical glass reaction vessel is equipped with a beaker bar agitator operating at about 200 revolutions per minute at a tip speed of about 0.1 meters per second, a pressure sensor, and a venting valve and is surrounded by a jacket containing aqueous constant temperature heating bath. The reactor is charged with 45.0 g. of a polyolefin mixture of average weight average molecular weight of 330,000 which is a 3:4 mixture of 19.3 g. of Lpsyn 7006 (an ethylene propylene copolymer of weight average molecular weight of 225,000 manufactured by Copolymer Corp.) and 25.7 g. of SM43A (an ethylene propylene copolymer of weight average molecular weight of 420,000 manufactured by Copolymer Corp.) and 0.7 g. of lauroyl peroxide initiator. The reaction vessel is checked for leaks by pressurization with nitrogen, evacuated to a subatmospheric pressure of about 5mm, and charged with 745 g. of vinyl chloride. After the vessel is sealed, about 80 g. of the vinyl chloride is vented from the reaction vessel to remove entrapped air thereby providing a net charge of vinyl chloride of about 665 g. and an initial polyolefin concentration of about 6.77% based on the weight of the vinyl chloride. The reaction mass is heated with agitation to a temperature of about 70–72° under an autogenous pressure of about 170–175 p.s.i.g. to initiate the polymerization. The polymerization mass changes from a substantially clear solution or dispersion, to an opaque slurry. After about 1.5 hours, there is a sharp increase in the reaction exotherm, i.e. in the heat evolved from the reaction mass as evidenced by a rise in reaction pressure. At about the same time, the consistency of the reaction mixture becomes similar to that of dough indicating the onset of the thick paste state of the polymerization. After about 5 minutes from the exotherm increase, the venting valve of the reactor is opened intermittently but regularly over a period of 30 minutes to vent about 8% of the vinyl chloride (based on net vinyl chloride changed) to an exhaust at atmospheric pressure at an aveage rate of about 0.267 percent per minute so that the effective concentration of polyolefin is about 7.37% (based on net vinyl chloride charged less vinyl chloride vented). On completion of the venting operation the polymerization rapidly advances to the powder state of polymerization, i.e. the polymerization mass changes from a highly viscous dough-like paste to substantially fine, nonviscous powder. The reaction is allowed to proceed under the foregoing conditions of temperature, pressure and agitation until no more liquid monomer is observed in the reaction vessel and the pressure therein begins to drop indicating the end of the polymerization. The duration of the polymerization from inception of initiation is about 2.9 hours.

The polymerization vessel is vented to the atmosphere to remove residual vinyl chloride. The particulate polymer in the reaction vessel (313 g.) together with scrapings from the reactor bottom and walls and the agitator, i.e. bottom cake, wall scale and stirrer deposit (61 g about 16.3 of total product) amount to a product yield of 374 g. of which about 12.3% is polyolefin in both grafted and free dispersed form so that the amount of polymer obtained from vinyl chloride is 329 g corresponding to a conversion of about 50% based on net vinyl chloride charged to the reaction.

The particulate portion of the product is then passed through a No. 16 mesh sieve (U.S. standard sieve size). The amount of particulate polymer fines, i.e. particles of average cross-sectional width of about 1.2 mm or less, which passes through the sieve is 108 g. (about 29% of total polymer product). The amount of particulate polymer retained on the sieve, i.e. polymer particles of average cross sectional width greater than about 1.2 mm, is 205 g. (55%) of which about 114 g is substantially evenly shaped granular polymer of average cross sectional width of about 1.2 mm to about 10 mm, about 49 g is globular polymer of average cross sectional width of about 10 to about 25 mm and about 42 g is in the form of three irregular agglomerates or lumps having an average cross sectional width (measured across their widest dimension) of about 30 mm.

The above mentioned particulate fraction of the product is tested for impact strength by the Notched Izod Impact Test, according to the procedure of ASTM-D256. Samples for use in this test are prepared by mixing together 100 parts of the polymer, 5 parts of Acryloid K120-ND (an acrylic polymer processing aid manufactured by Rohm and Haas Co.) and 2 parts Thermolite 31 [di-n-butyl tin S,S′-bis(isooctyl mercapto-acetate) thermal stabilizer, manufactured by M and T Chemicals Inc.]. The mixture is milled on a two roll Farrell mill for 5 minutes at about 188° and compression molded into a sheet of ⅛ inch thickness on a Carver press. The sheet is cut into uniform 0.5 inch by 2.5 inch test strips.

The Izod impact (notched) strength is excellent, being in the range of about 10 to 18 foot-lbs. per inch.

The percent grafting in the polymer product is determined by extracting the free ungrafted polyolefin and vinylchloride homopolymer and recovering vinyl chloride-polyolefin graft polymer from the polymer product employing a procedure similar to that described in Example 3 of aforementioned U.S. application Ser. No. 674,202. The vinyl chloride-polyolefin graft polymer is analyzed for percent chlorine by a conventional analytical technique. The percentage of chlorine obtained is divided by 56.8%, the percent chlorine in conventional vinyl chloride homopolymer, to determine the percentage of vinyl chloride in the graft polymer. The latter percentage on subtraction from 100 gives the percent grafted polyolefin in the graft polymer. From the latter percentage and the percentage of free ungrafted polyolefin in the product the percent grafting in the total polymer product is computed. The present polymer product is characterized by a percent grafting of 84% (corresponding to a vinyl halide-polyolefin graft polymer content in the product of about 10.3%).

EXAMPLES 2–6

The procedure of Example 1 is repeated substantially as described in Examples 3–5 employing net changes of vinyl chloride of about 660 to 670 g. of vinyl chloride and several process variations as noted in the Table below which summarizes the results of these experiments in comparison with those of Example 1. Examples 2 and 6, the results of which are also summarized in the Table are control experiments which are carried out employing substantially the same process conditions as those of Examples 1, 3–5 except that no vinyl chloride is removed during the paste state of the polymerization.

By comparison of the results of Examples 1,3–5 with those of control Example 2 it is apparent that removal of vinyl chloride monomer during the thick paste state in accordance with invention provides a vinyl chloride-polyolefin in polymer of high impact strength with improved small particle size, i.e. a greater proportion of the product is particulate polymer having an average cross sectional width of less than about 1.2 mm while the average cross sectional width of the largest polymer particle is reduced from about 700 mm (as in control Example 2) to about 30 mm (as in Example 1).

From comparison of the results of control Example 6 with those of Examples 1–5 it is also apparent that a satisfactory excellent impact strength as measured by the highly discriminating Notched Izod Impact Strength Test is obtained when the percentage of grafted polyolefin in the polymer product is greater than about 6 percent.

Control Example 6 illustrates that whereas an initial concentration of 5.3% polyolefin in the polymerization reaction mass provides a polymer product of desirably small particle size such a small concentration of polyolefin in the reaction mixture, when it remains the effective polyolefin reaction concentration by omission of the monomer removal step of the invention, produces polymer product of low graft polyolefin content, i.e. 6% or less, and, hence, of unsatisfactory, inferior impact strength compared to that of the products of corresponding Examples 3-5. In the latter examples, the polymerization masses have initial polyolefin concentrations of about 5.3% as in Example 6 but monomer removal in accord with the invention in these examples raises the effective polyolefin reaction concentration to about 6.9% to about 7.6% resulting in products of enhanced impact strength.

ing the particulate portion (321 g., 71% of the total product), 98 g. (26%) is of average particle cross-sectional width less than about 1.2 mm.; 166 g. (45%) is of average cross-sectional width greater than about 1.2 mm. of which 89 g. is substantially evenly shaped granular polymer of average cross sectional width of about 1.2 mm. to about 5 mm. and 77 g. is globular agglomerates of average cross sectional width greater than about 5 mm; the maximum cross sectional width of such agglomerates being about 15 mm. The particles of width of less than about 1.2 mm. and those of width between about 1.2 and about 5 mm. have a 10% total polyolefin content with the percentage grafting being about 90% (corresponding to about 9% graft polyolefin in the product) and a Notched Izod Impact strength of about 16 ft.-lbs. per inch.

EXAMPLE 8

To a vertical type first stage reactor of 2.5 gallon capacity and stainless steel construction, equipped with a radial turbine-type agitation a pressure sensor and a

TABLE

| Example | Net Vinyl Chloride Charged (c.) | % Vinyl Chloride Vented During Thick Paste State | % Polyolefin Charged | Effective % Contration of Polyolefin | Rate of Venting (% per min.) | Time of Beginning of Venting After Inception of Thick Paste State (min.) | Duration of Venting (min.) | % Conversion of Vinyl Chloride (Operation of Rejection) |
|---|---|---|---|---|---|---|---|---|
| 1 | 565 | 8 | 6.77 | 7.37 | 0.267 | 5 | 30 | 50 (2.9 hrs.) |
| 2 (Control) | 665 | none | 6.77 | 6.77 | 0 | — | 0 | 58 (4.3 hrs.) |
| 3 | 660 | 30 | 5.3 | 7.57 | 1.2 | 5 | 25 | 41 (2.3 hrs.) |
| 4 | 665 | 24 | 5.27 | 6.92 | 0.8 | 10 | 30 | 47 (2.5 hrs.) |
| 5 | 670 | 27 | 5.23 | 7.15 | 0.9 | 20 | 30 | 44 (2.3 hrs.) |
| 6 (Control) | 660 | none | 5.3 | 53 | 0 | — | 0 | 71 (3.5 hrs.) |

| Example | % Total Polyolefin in Product | % Grafting (% Graft Polyolefin in Product) | Particulate Product | | Largest Particle Size in Particulate Product (−n) | % Non-Particulate Process |
|---|---|---|---|---|---|---|
| | | | % Total Product ≦about 1.2 mm Cross Sectional Width | % Total Product >about 1.2 mm Cross Sectional Width | | |
| 1 | 12.3 | 84 (10.3) | 29 | 55 | 30 | 16 |
| 2 (Control) | 10.4 | 83 (8.7) | 11 | 82 | 700 | 7 |
| 3 | 11.5 | — | 36 | 48 | — | 14 |
| 4 | 10.0 | 85 (8.5) | 57 | 27 | 5 | 16 |
| 5 | 10.5 | 79 (8.8) | 54 | 30 | 15 | 16 |
| 6 (Control) | 7.0 | 86 (6.0) | 60 | 22 | 15 | 15 |

Note:
The particulate products of Examples 1-3,5 have excellent Notched Izod Impact strengths in the range of about 10-18 ft. lbs. per inch. The particulate product of Example 4 has an exceptionally fine impact strength of 19 ft. lbs. per inch, while the impact strength of the particulate product of control Example 6 is poor being only about 2 ft. lbs. per inch.

EXAMPLE 7

The procedure of Example 1 is repeated substantially as described except that the net charge of vinyl chloride is 670g., the polyolefin is 42.5 g. of a mixture (average weight average molecular weight, 390,000) of 10 g. of Epsyn 7006 and 32.5 g. of SK 43A corresponding to an initial polyolefin concentration of 6.34% based on net vinyl chloride charged, vinyl chloride removal by venting is commenced about 10 minutes after the increase in the reaction exotherm which indicates the beginning of the thick paste state of the polymerization, venting of vinyl chloride is continued for 15 minutes to remove about 10% of the vinyl chloride charged (providing an effective polyolefin concentration of about 7.05%) at an average rate of about 0.33% per minute and the duration of reaction is 2.8 hours. The particulate polymer in the reaction vessel (321 g.) together with cake from the reactor bottom (41 g.), reactor wall scale (16 g) and deposit on the agitator (50 g.) amounts to a product yield of 371 g. of which about 11.5% is polyolefin in grafted and free dispensed form so that the conversion of vinyl chloride to polymer is 328 g.(52%). On screen-venting valve, there is added 6.81 kg. vinyl chloride monomer, 1.26 g. of dicyclohexyl peroxydicarbonate polymerization initiator sold under the tradename "Lupersol 229" and 0.75 g. of a 50% methanol solution of "Gelva" (a densifying agent which is a 2:1 copolymer of vinyl acetate and crotonic acid manufactured by Monsanto Co.). About 0.908 kg. of vinyl chloride monomer are vented from the reactor in order to remove entrapped air. The reaction mass is heated to about 70° under an autogeneous reaction pressure of about 167 psig. with the agitator operating at about 1500 rpm and agitated at these conditions of temperature and pressure for about 25 minutes after which period the conversion of vinyl chloride to vinyl chloride polymer is about 8% and the reaction mixture is ready for transfer to the second stage reactor as described hereinbelow.

Meanwhile into the second stage reactor, which is a 5 gallon stainless steel vessel equipped with a spiral agitator operating at a speed of about 63 rpm, a pressure sensor and a venting valve, there is charged at 0°, 408.63 g of Epsyn 40A (an ethylene propylene-modified terpolymer of about 160,000 weight average molecular weight, wherein the ethylene-propylene ratio is about 55/45 and the diene is ethylidene norbornene present in an amount of 3± 0.5 percent, manufactured by the Copolymer Corp.) which has been finely shredded and dusted with 58.38 g. of pulverulent bulk polymerized vinyl chloride polymer (to prevent aggolmeration and promote dissolution of the polyolefin in the reaction mixture) and 0.4 g of 2,6di-t-butyl paracresol antioxidant color stabilizer. The mixture is freed of air by drawing a vacuum of about 29 inches of mercury in the reaction vessel and thereafter flooding the vessel with nitrogen. After repetition of the air removal treatment, 3.75 g. of the "Lupersol 229" initiator and about 7.72 kg. of additional vinyl chloride monomer are charged to the reactor thereby providing a proportion of polyolefin based on monomer of about 3%. After the reaction vessel is sealed, the reaction mixture is heated under agitation to about 40° and the first stage reaction mixture described hereinabove is added. The reaction mass is then maintained at the reaction temperature of about 58° under an autogeneous reaction pressure of about 130 psig. for about 2 hours to reach the thick paste stage of the polymerization reaction. About 4.54 kg. of vinyl chloride monomer are then vented from the agitated reaction mixture over a period of about 40 minutes to provide an effective polyolefin concentration of 4.5%, with the pressure and temperature of the reaction vessel dropping to about 90 psig. and about 47°, respectively, during the venting operation. On completion of the venting operation, the agitated reaction mixture is heated over a period of 35 minutes to a temperature of about 58° and a pressure of about 130 psig. and is maintained at the latter conditions of temperature and pressure for about 40 minutes. At the end of the latter time period a drop in the pressure in the reaction vessel indicates that the polymerization reaction is substantially complete. The reaction vessel is heated to about 70° and any unreacted vinyl chloride monomer in the vessel is vented therefrom over a 45 minute period. To insure as complete as possible removal of vinyl chloride monomer residue from the product, the product is degassed in vacuo at 85° for about 4 hours and subsequently at about 0° for about one hour and then is discharged from the reactor.

A pulverulent polymer product of excellent impact strength is obtained in a yield of about 7.36 kg. (corresponding to a conversion of monomer to polymer of about 77% based on monomer charged to the polymerization which does not include the monomer vented during the thick paste state in the second reaction stage.) About 90.1% portion of the product passes through a 10 mesh screen (U.S. Standard Sieve Series). The latter portion of the product contains only about 47 parts per million of residual vinyl chloride monomer.

EXAMPLE 9 (Control)

The procedure of Example 8 is repeated substantially as described except that the amount of vinyl halide monomer and initiator charged at the beginning of the second reaction stage is 3.18 kg. and 5.0 g., respectively, and the monomer removal step of the invention is omitted so that the proportion of polyolefin based on monomer in the second stage is substantially the same as that in Example 8 above subsequent to the monomer removal step, i.e. about 4.5%. The product which has satisfactory impact resistance is obtained in a yield of 7.72 kg. (corresponding to a conversion of monomer to polymer of about 80% based on monomer charged to the polymerization). Only about 60% of the product is capable of passing through the 10 mesh screen described in Example 8. The amount of residual vinyl chloride monomer in the product fraction which passed through the 10 mesh screen is about 900 ppm. Comparison of the results of this example with that of Example 8 above illustrates that the process of the invention effects a substantial enhancement of the proportion of small size product particles obtained and a substantial diminution of residual vinyl chloride monomer therein even when, as shown in Example 8, the effective concentration of the polyolefin subsequent to the monomer removal step is substantially below the preferred value of above about 5.3%.

In the foregoing Examples 1,3–5, 7 and 8 which are illustrative of the invention it will be apparent that many process changes can be made without departing from either the spirit or the scope of the invention. For example, if desired, a portion, e.g. about 10% of the vinyl chloride reactant, may be replaced by a compatible comonomer, e.g. methyl acrylate, to obtain an excellent finely divided particulate vinyl chloride-methyl acrylatepolyolefin polymer. Also, advantageously the vinyl chloride which is allowed to escape in the aforementioned illustrative examples can be collected by venting the vinyl chloride to a cooled receiver at atmospheric pressure or to a compressor for liquification. The resultant recovered vinyl chloride can be reserved for later polymerization. Furthermore, excellent results are obtained in the aforementioned illustrative examples when the ethylene propylene polyolefin reactant is replaced by the following olefin polymers: polyethylene, polypropylene and ethylene propylene diene-modified terpolymer having an ethylene/propylene ratio of 55/45 and containing 1,4-hexadiene as the diene in an amount of 3 ± 0.5 percent, a 1-butene -ethylene copolymer containing 5% ethylene and chlorinated polyethylene sold under the trademark "Tyrin".

Moreover, instead of adding the polyolefin reactant directly to the polymerization as described in the above Examples, the polyolefin can be mixed with all, or more conveniently, a portion of the vinyl halide monomer reactant and dissolved, partially dissolved or dispersed in said monomer with heating and/or agitation, as desired, prior to addition to the reaction vessel. While the addition of the polyolefin to the polymerization reaction mixture according to the invention can be carried out at the beginning of polymerization reaction, i.e. at 0% conversion by weight of monomer to the polymer, it is desirable that the polyolefin be added immediately after some of the monomer, i.e. up to about 20%, has been converted to polymer, preferably after about 1% to about 15%, more preferably about 3% to 15% conversion of monomer to polymer. When the polymerization is operated as a two stage process in accordance with the aforementioned techniques of British Pat. No. 1,047,489 and U.S. Pat. No. 3,522,227, the polyolefin is added to the polymerization substantially immediately after the completion of the first stage, i.e. after preferably about 3% to 15% by weight and more preferably about 7% to about 15% of the monomer has been converted to polymer. Conveniently, in carrying out the polymerization in the two stage reaction configuration, the polyolefin is added to the second stage so as to be present in the second stage reaction vessel prior to occurrence of any substantial polymerization therein.

The addition of the polyolefin reactant subsequent to initiation of the polymerization as described above provides in conjunction with the monomer venting procedure of the invention, in general, a faster polymerization reaction, a lower concentration of residual vinyl halide monomer in the polymerization product, and especially, a particularly excellent distribution of product particle size, i.e. the product is characterized by an especially narrow distribution of product particle size and contains an especially large, generally predominant, fraction of the most minute particles. Such improved product particle size distribution is of especial advantage in many uses of the product such as injection molding and extrusion of articles such as pipe and siding.

According to another preferred mode of carrying out the invention, it is advantageous when operating the polymerization according to the aforementioned two stage configuration to add to the first reaction stage only a portion, of the monomer or monomers used in the process with the balance being added so as to be present in the second reaction stage prior to the thick paste state venting operation which in the two stage reaction configuration is carried out in the second reaction stage. Generally at least about 50% by weight or more of the monomer reactant (corresponding to at least about 60% by weight or more of the monomer reactant when the amount of monomer vented in the thick paste state is discounted from the amount of monomer used in the polymerization) is added to the first reaction stage with the balance being added at about the beginning of the second reaction stage (so that it is present prior to the venting operation of the invention). Preferably about 50% to about 60% by weight of the monomer reactant is added in the first reaction stage (corresponding to addition of about 60% to about 70% of the monomer reactant when the monomer reactant which is vented is discounted as described above).

This preferred mode of charging monomer or monomers in carrying out the polymerization in the aforementioned two reaction stage configuration permits use of a first stage reaction vessel of smaller size than that used in the second reaction stage and also in general, assists in providing a product of excellent particle size distribution.

While this invention has been described with reference to certain specific embodiments, it will be recognized by those skilled in the art that many variations are possible (as illustrated above) without departing from the spirit and scope of the invention.

What is claimed is:

1. In the process for the preparation of a vinyl halide polymer which comprises polymerizing in bulk a vinyl halide monomer, in the liquid phase, either alone or in combination with up to about 50% by weight of another ethylenically unsaturated monomer copolymerizable therewith, in the initial presence of more than about 1.8% by weight based on said vinyl halide monomer of a polyolefin or mixture of polyolefins having a weight average molecular weight of at least about 50,000, the improvement which comprises removing from the polymerization mass during the thick paste state thereof from about 2% to less than about 50% by weight of the vinyl halide charged to the polymerization mass, the effective concentration of said polyolefin or mixture of polyolefins after said vinyl halide removal being above about 3.5 weight percent based on vinyl halide remaining in said polymerization mass after said removal of vinyl halide whereby a more finely divided particulate product of high impact strength is obtained.

2. The process of claim 1 wherein the polymer prepared is a vinyl halide homopolymer, the polymerization is carried out in a single stage, and the polyolefin is selected from the group consisting of:
   1. halogenated polyolefins;
   2. olefin homopolymers;
   3. olefin copolymers and terpolymers;

said polymers having 2 to 8 carbon atoms in the monomeric units thereof and a weight average molecular weight of about 150,000 to 1,000,000 and the amount of vinyl halide monomer removed is about 5% to about 40% of the vinyl halide monomer charged to the polymerization.

3. The process of claim 2 wherein the initial concentration of polyolefin or mixture of polyolefins is at least about 3% by weight based on said vinyl halide monomer and the effective concentration of said polyolefin or mixture of polyolefins after said vinyl halide removal is above about 5.3 weight percent based on vinyl halide remaining in the polymerization mass after said removal of vinyl halide.

4. The process of claim 3 wherein said vinyl halide monomer is vinyl chloride, the polymerization is a single stage bulk polymerization carried out at a temperature of about 25° to about 90° centigrade under at least autogeneous superatmospheric pressure in the presence of an initiating amount of a free radical initiator for the reaction, the thick paste state of the polymerization mass corresponds to a conversion of vinyl chloride to polymer of about 30% to about 40% by weight, and about 8% to 35% by weight of the vinyl chloride is removed by venting from said pressurized polymerization mass and said polyolefin terpolymers contain a diene as a monomeric unit.

5. The process of claim 4 wherein the vinyl chloride is vented from the polymerization mass at a rate of about 0.1 to 1.5% by weight vinyl chloride per minute based on vinyl chloride charge to the polymerization, the polymerization temperature is from about 40° to about 80° centigrade at autogenous superatmospheric pressure, the diene of the polyolefin terpolymer is selected from the group consisting of dicyclopentadiene, 1,3-butadiene and non-conjugated dienes with linear or cyclic chains and is present in said terpolymer in a proportion up to about 15% by weight of said terpolymer and the effective concentration of polyolefin in the polymerization mass is about 5.5% to about 10% by weight.

6. The process of claim 5 wherein the diene of the polyolefin terpolymer is present in said terpolymer in a proportion up to about 6% by weight of said terpolymer.

7. The process of claim 6 wherein the polymerization temperature is from about 50° to about 75° centigrade, the initiator is an organic peroxy- or azo compound added to the polymerization mass in a concentration of about 0.01% to about 1.0% based on the weight of vinyl chloride the effective concentration of polyolefin is about 6% to about 9% by weight based on vinyl chloride and the vinyl chloride is vented from the polymerization mixture at a rate of about 0.15% to 1.2% per minute, said venting commencing about 5 to about 15 minutes after onset of the thick paste state in the polymerization mass.

8. The process of claim 7 wherein the average weight average molecular weight of the polyolefin is about 150,000 to about 400,000, the initiator is an organic peroxide, and the vinyl chloride is vented from the polymerization mixture at a rate of about 0.3% to about 1.2% per minute.

9. The process of claim 8 wherein the polyolefin reactant is an olefin copolymer or terpolymer.

10. The process of claim 9 wherein the polyolefin is ethylene-propylene ethylindene norbornene terpolymer.

11. The process of claim 9 wherein the polyolefin is an ethylene-propylene 1,4-hexadiene terpolymer.

12. The process of claim 9 wherein the polyolefin is an ethylene-propylene copolymer.

13. The process of claim 9 wherein the polyolefin is a butene-1-ethylene copolymer.

14. The process of claim 8 wherein the polyolefin is an olefin homopolymer.

15. The process of claim 14 wherein the olefin homopolymer is polyethylene.

16. The process of claim 14 wherein the olefin homopolmyer is polypropylene.

17. The process of claim 8 wherein the polyolefin is a halogenated polyolefin.

18. The process of claim 17 wherein the halogenated polyolefin is chlorinated polyethylene.

19. The process of claim 1 comprising carrying out the polymerization in a first stage wherein the reaction mixture is subjected to high speed agitation until about 3 to about 20% by weight of said monomer or monomers have been converted to polymers and further polymerizing the resultant reaction mixture together with additional monomer or monomers in a second stage during which the reaction mixture is subjected to low speed agitation until polymerization has been completed so that the thick paste state of the polymerization and the removal therein of vinyl halide takes place in said second reaction stage.

20. The process of claim 19 wherein a portion, amounting to at least about 50% by weight, of the monomer or monomers charged to the polymerization reaction are added in the first stage, the balance of the monomer or the monomers being added at about the beginning of the second stage.

21. The process of claim 20 wherein there is added in the first stage about 50% to about 60% by weight of the monomer or monomers charged to the polymerization reaction.

22. The process of claim 21 wherein about 3% to about 15% by weight of the monomer or monomers is converted to polymer in the first reaction stage.

23. The process of claim 22 wherein about 7% to about 15% of monomer or monomers is converted to polymer in the first reaction stage.

24. The process of claim 23 wherein the monomer reactant is vinyl chloride.

25. In the process for the preparation of a vinyl halide polymer which comprises polymerizing in bulk a vinyl halide monomer, in the liquid phase, either alone or in combination with up to about 50% by weight of another ethylenically unsaturated monomer copolymerizable therewith, in the initial presence of more than about 1.8% by weight based on said vinyl halide monomer of a polyolefin or mixture of polyolefins having a weight average molecular weight of at least about 50,000, said polyolefin or mixture of polyolefins being present during the polymerization only during the period which commences at 0% to about 20% conversion of the monomer or monomers to polymer and concludes with the end of the polymerization, the improvement which comprises removing from the polymerization mass during the thick paste state thereof from about 2% to less than about 50% by weight of the vinyl halide changed to the polymerization mass, the effective concentration of said polyolefin or mixture of polyolefins after said vinyl halide removal being above about 3.5 weight percent based on vinyl halide remaining in said polymerization mass after said removal of vinyl halide whereby a more finely divided particulate product of high impact strength is obtained.

26. The process of claim 25 wherein the polymer prepared is a vinyl halide homopolymer, the polymerization is carried out in a single stage, and the polyolefin is selected from the group consisting of:
  1. halogenated polyolefins;
  2. olefin homopolymers;
  3. olefin copolymers and terpolymers;

said polymers having 2 to 8 carbon atoms in the monomeric units thereof and a weight average molecular weight of about 50,000 to 1,000,000 and the amount of vinyl halide monomer removed is about 5% to about 40% of the vinyl halide monomer charged to the polymerization mass.

27. The process of claim 26 wherein the olefin polymer is present in the polymerization after about 1% of the monomer or monomers have been converted to polymer.

28. The process of claim 27 wherein the olefin polymer is present in the polymerization after about 3% to about 15% by weight of the monomers have been converted to polymer.

29. The process of claim 28 wherein the initial concentration of polyolefin or mixture of polyolefins is at least about 3% by weight based on said vinyl halide monomer and the effective concentration of said polyolefin or mixture of polyolefins after said vinyl halide removal is above about 5.3 weight percent based on vinyl halide remaining in the polymerization mass after said removal of vinyl halide.

30. The process of claim 29 wherein said vinyl halide monomer is vinyl chloride, the polymerization is a single stage bulk polymerization carried out at a temperature of about 25° to about 90° centigrade under at least autogeneous superatmospheric pressure in the presence of an initiating amount of a free radical initiator for the reaction, the thick paste state of the polymerization mass corresponds to a conversion of vinyl chloride to polymer of about 30% to about 40% by weight, and about 8% to 35% by weight of the vinyl chloride is removed by venting from said presurized polymerization mass and said polyolefin terpolymers contain a diene as a monomeric unit.

31. The process of claim 30 wherein the vinyl chloride is vented from the polymerization mass at a rate of about 0.1 to 1.5% by weight vinyl chloride per minute based on vinyl chloride charged to the polymerization, the polymerization temperature is from about 40° to about 80° centigrade at autogeneous superatmospheric pressure, the diene of the polyolefin terpolymer is selected from the group consisting of dicyclopentadiene, 1,3-butadiene and non-conjugated dienes with linear or cyclic chains and is present in said terpolymer in a proportion up to about 15% by weight of said terpolymer and the effective concentration of polyolefin in the polymerization mass is about 5.5% to about 10% by weight.

32. The process of claim 31 wherein the diene of the polyolefin terpolymer is present in said terpolymer in a proportion up to about 6% by weight of said terpolymer.

33. The process of claim 32 wherein the polymerization temperature is from about 50° to about 75° centigrade, the initiator is an organic peroxy- or azo compound added to the polymerization mass in a concentration of about 0.01% to about 1.0% based on the weight of vinyl chloride, the effective concentration of polyolefin is about 6% to about 9% by weight based on vinyl chloride and the vinyl chloride is vented from the polymerization mixture at a rate of about 0.15% to 1.2% per minute, said venting commencing about 5 to about 15 minutes after onset of the thick paste state in the polymerization.

34. The process of claim 33 wherein the initiator is an organic peroxide, and the vinyl chloride is vented from the polymerization mixture at a rate of about 0.3% to about 1.2% per minute.

35. The process of claim 34 wherein the polyolefin is an olefin copolymer or terpolymer.

36. The process of claim 35 wherein the polyolefin is ethylene-propylene ethylidene norbornene terpolymer.

37. The process of claim 35 wherein the polyolefin is an ethylene-propylene 1,4-hexadiene terpolymer.

38. The process of claim 35 wherein the polyolefin is an ethylene-propylene copolymer.

39. The process of claim 35 wherein the polyolefin is a butene-1-ethylene copolymer.

40. The process of claim 34 wherein the polyolefin is an olefin homopolymer.

41. The process of claim 40 wherein the olefin homopolymer is polyethylene.

42. The process of claim 40 wherein the olefin homopolymer is polypropylene.

43. The process of claim 34 wherein the halogenated polyolefin is chlorinated polyolefin.

44. The process of claim 43 wherein the halgenated polyolefin is chlorinated polyethylene.

45. The process of claim 25 comprising carrying out the polymerization in a first stage, wherein the reaction mixture is subjected to high speed agitation until about 3 to about 20% by weight of said monomer or monomers have been converted to polymers and further polymerizing the resultant reaction mixture together with additional monomer or monomers in a second stage during which the reaction mixture is subjected to low speed agitation until polymerization has been completed, said polyolefin or mixture of polyolefins being introduced to the reaction mixture at the beginning of the second reaction stage so that the thick paste state of the polymerization and the removal therein of vinyl halide takes place in said second reaction stage.

46. The process of claim 45 wherein a portion, amounting to at least about 50% by weight, of the monomer or monomers charged to the polymerization reaction are added in the first stage, the balance of the monomer or monomers being added at about the beginning of the second stage.

47. The process of claim 45 wherein there is added in the first stage about 50% to about 60% by weight of the monomer or monomers charged to the polymerization reaction.

48. The process of claim 47 wherein about 3% to about 15% by weight of the monomer or monomers is converted to polymer in the first reaction stage.

49. The process of claim 48 wherein about 7% to about 15% of monomer or monomers is converted to polymer in the first reaction stage.

50. The process of claim 49 wherein the monomer reactant is vinyl chloride.

51. The process of claim 26 wherein the weight average molecular weight of the polyolefin reactant is about 50,000 to about 150,000.

52. The process of claim 26 wherein the weight average molecular weight of the polyolefin reactant is about 150,000 to about 1,000,000.

53. In the process for the preparation of a vinyl halide polymer which comprises polymerizing in bulk a vinyl halide monomer, in the liquid phase, either along or in combination with up to about 50% be weight of another ethylenically unsaturated monomer copolymerizable therewith in the initial presence of more than about 1.8% by weight based on said vinyl halide monomer of a polyolefin or mixture of polyolefins having a weight average molecular weight of at least about 50,000, said polyolefin or mixture of polyolefins being present during the polymerization only during the period which commences at 0% to about 20% conversion of the monomer or monomers to polymer and concludes with the end of the polymerization, said polymerization being carried out in a first stage wherein the reaction mixture is subjected to high speed agitation until about 3% to about 20% by weight of said monomer or monomers have been converted to polymer, and further polymerizing the resultant reaction mixture together with additional monomer or monomers in a second stage during which the reaction mixture is subjected to low speed agitation until the polymerization has been completed, the improvement which comprises removing from the polymerization mass during the thick paste state thereof from about 2% to less than about 50% by weight of the vinyl halide charged to the polymerization mass, the effective concentration of said polyolefin or mixture of polyolefins after said vinyl halide removal being above about 3.5 weight percent based on vinyl halide remaining in said polymerization mass after said removal of vinyl halide whereby a more finely divided particulate product of high impact strength is obtained.

54. A high impact strength polyvinyl halide prepared by the process of claim 1.

55. A high impact strength polyvinyl halide prepared by the process of claim 25.

56. A high impact strength polyvinyl halide prepared by the process of claim 53.

57. The process of claim 45 wherein the olefin polymer is introduced to the polymerization reaction in admixture with a portion of the monomer or monomers used in the polymerization reaction.

58. The process of claim 68 wherein about 50% to about 60% of the monomer or monomers charged to the polymerization are added in the first stage with the balance being added at about the beginning of the second stage.

* * * * *